United States Patent
Sheidler

(10) Patent No.: US 11,293,334 B2
(45) Date of Patent: Apr. 5, 2022

(54) THERMOSTATICALLY CONTROLLED MULTI-CIRCUIT COOLING SYSTEM

(71) Applicant: DEERE & COMPANY, Moline, IL (US)

(72) Inventor: Alan D. Sheidler, Moline, IL (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 16/861,174

(22) Filed: Apr. 28, 2020

(65) Prior Publication Data

US 2021/0332741 A1    Oct. 28, 2021

(51) Int. Cl.
| | |
|---|---|
| *F01P 7/16* | (2006.01) |
| *F01P 5/02* | (2006.01) |
| *F01P 3/18* | (2006.01) |
| *F02B 29/04* | (2006.01) |
| *F01M 5/00* | (2006.01) |
| *F01P 7/02* | (2006.01) |
| *F01P 5/10* | (2006.01) |

(52) U.S. Cl.
CPC .............. *F01P 7/16* (2013.01); *F01M 5/007* (2013.01); *F01P 3/18* (2013.01); *F01P 5/02* (2013.01); *F01P 5/10* (2013.01); *F01P 7/026* (2013.01); *F02B 29/0418* (2013.01); *F01P 2060/04* (2013.01)

(58) Field of Classification Search
CPC ....... F01P 7/16; F01P 3/18; F01P 5/02; F01M 5/007
USPC ............................................ 123/41.08, 41.05
See application file for complete search history.

(56) References Cited

U.S. PATENT DOCUMENTS

| | | | | |
|---|---|---|---|---|
| 5,098,036 A * | 3/1992 | Brigham | ................... | B64F 5/23 |
| | | | | 122/26 |
| 5,408,843 A * | 4/1995 | Lukas | .................. | B60H 1/3227 |
| | | | | 62/244 |
| 5,669,338 A | 9/1997 | Pribble et al. | | |
| 7,261,068 B1 | 8/2007 | Wantschik | | |
| 2003/0221638 A1* | 12/2003 | Haase | ..................... | F01P 7/165 |
| | | | | 123/41.01 |
| 2006/0037590 A1 | 2/2006 | Uzkan et al. | | |
| 2006/0060345 A1* | 3/2006 | Flik | .......................... | F01P 11/08 |
| | | | | 165/297 |
| 2006/0185626 A1* | 8/2006 | Allen | ..................... | F02M 26/28 |
| | | | | 123/41.12 |
| 2012/0103282 A1 | 5/2012 | Deivasigamani | | |
| 2013/0019819 A1 | 1/2013 | Dye et al. | | |
| 2017/0204780 A1* | 7/2017 | Asano | ................. | F02B 29/0443 |
| 2017/0361698 A1* | 12/2017 | Hussain | .................... | F01P 1/06 |

(Continued)

*Primary Examiner* — Mahmoud Gimie

(57) ABSTRACT

A cooling system includes a fan, a first fluid circuit, and a second fluid circuit. The first fluid circuit includes a first fluid, a first heat exchanger, a first exchanger bypass, and a first thermostat to selectively control flow of the first fluid between the first heat exchanger and the first exchanger bypass. The second fluid circuit is fluidly independent of the first fluid circuit. The second fluid circuit includes a second fluid separate from the first fluid, a second heat exchanger, a second exchanger bypass, and a second thermostat to selectively control flow of the second fluid between the second heat exchanger and the second exchanger bypass. The fan is positioned in proximity to the first heat exchanger and the second heat exchanger to cool the first fluid and the second fluid dependent upon operation of the first thermostat and the second thermostat, respectively.

8 Claims, 3 Drawing Sheets

(56) References Cited

U.S. PATENT DOCUMENTS

2019/0128171 A1* 5/2019 Kurimoto .............. B60H 1/004
2020/0355143 A1* 11/2020 Kuske ................... F02M 26/30

* cited by examiner

THERMOSTATICALLY CONTROLLED MULTI-CIRCUIT COOLING SYSTEM

FIELD OF THE DISCLOSURE

The present disclosure relates to a cooling system, in particular, to a cooling system with a plurality of heat exchangers.

BACKGROUND OF THE DISCLOSURE

Vehicles, such as agricultural harvesters, commonly have a cooling system for cooling multiple fluid circuits. The fluid circuits typically include one or more of a charge-air circuit, a liquid coolant circuit for an engine, a hydraulic circuit, and an air conditioning circuit, to name some examples. Each fluid circuit typically has a heat exchanger. The heat exchangers are sometimes arranged in a stack cooled by the airflow generated by a fan positioned near the stack. It is common for the liquid coolant circuit for the engine to have a thermostat so as to be thermostatically controlled.

SUMMARY OF THE DISCLOSURE

According to an aspect of the present disclosure, there is disclosed a cooling system comprising a fan, a first fluid circuit, and a second fluid circuit. The first fluid circuit comprises a first fluid, a first heat exchanger, a first exchanger bypass, and a first thermostat to selectively control flow of the first fluid between the first heat exchanger and the first exchanger bypass. The second fluid circuit is fluidly independent of the first fluid circuit. The second fluid circuit comprises a second fluid separate from the first fluid, a second heat exchanger, a second exchanger bypass, and a second thermostat to selectively control flow of the second fluid between the second heat exchanger and the second exchanger bypass. The fan is positioned in proximity to the first heat exchanger and the second heat exchanger to cool the first fluid and the second fluid dependent upon operation of the first thermostat and the second thermostat, respectively.

The above and other features will become apparent from the following description and accompanying drawings.

BRIEF DESCRIPTION OF THE DRAWINGS

The detailed description of the drawings refers to the accompanying figures in which.

DETAILED DESCRIPTION OF THE DRAWINGS

Figure 1:
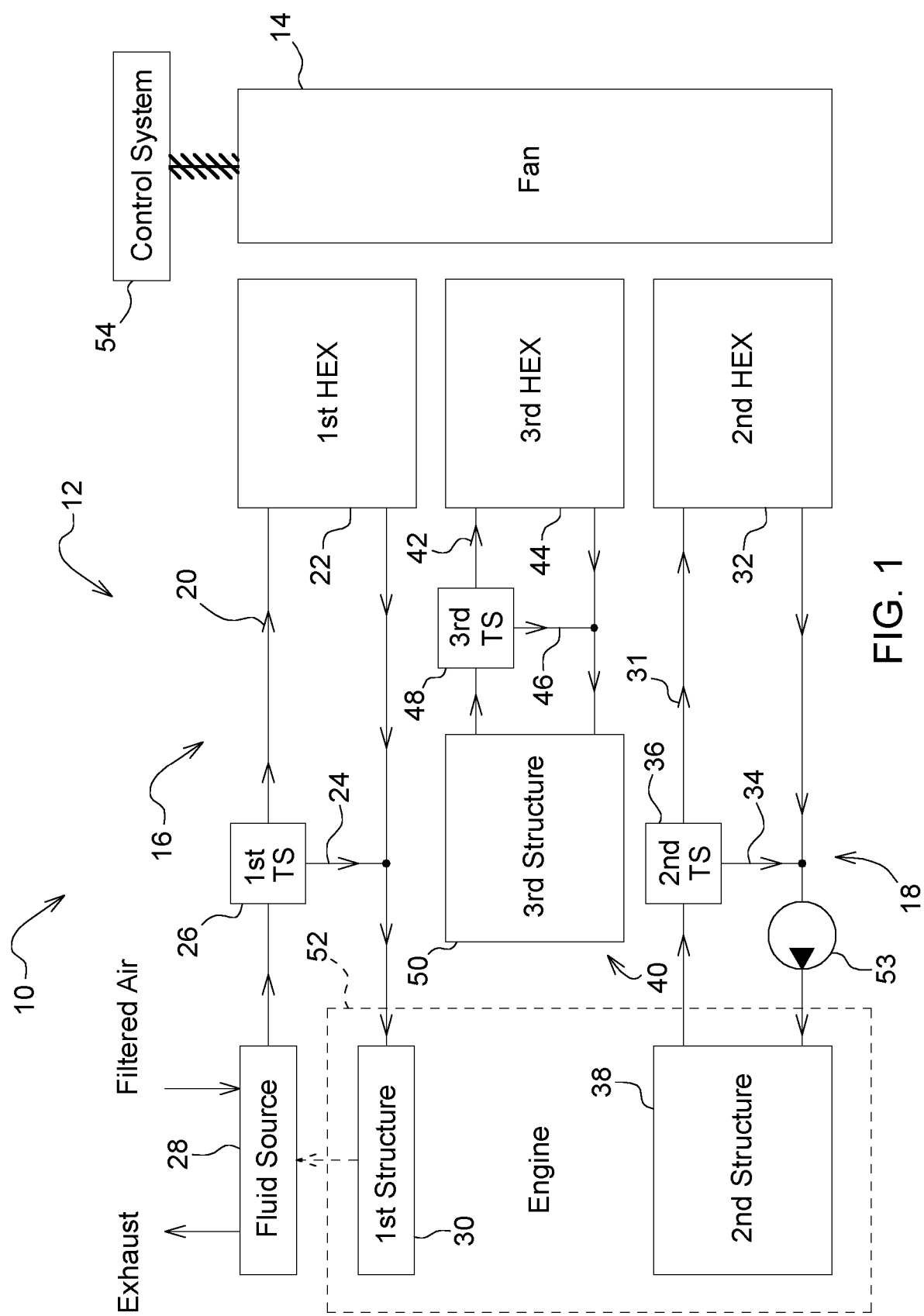
FIG. 1 is a diagrammatic view showing a vehicle with a cooling system having multiple thermostatically controlled fluid circuits.

Referring to FIG. 1, a vehicle 10 has a cooling system 12 to regulate thermostatically the temperature of various structures or sub-systems of the vehicle 10. The vehicle 10 may be any of a wide variety of vehicles, such as, for example, agricultural, construction, forestry, or other vehicles. In some embodiments, the vehicle 10 is configured as a combine harvester.

The cooling system 12 includes a fan 14, a first fluid circuit 16, and a second fluid circuit 18. The first fluid circuit 16 includes a first fluid 20, a first heat exchanger 22, a first exchanger bypass 24, and a first thermostat 26 to selectively control flow of the first fluid 20 between the first heat exchanger 22 and the first exchanger bypass 24. Illustratively, the first thermostat 26 is fluidly coupled to a fluid source 28, the first heat exchanger 22, and the first exchanger bypass 24 to receive the first fluid 20 from the fluid source 28 and direct the first fluid 20 to one or both of the first heat exchanger 22 and the first exchanger bypass 24 dependent upon the temperature of the first fluid 20. The first heat exchanger 22 and the first exchanger bypass 24 are fluidly coupled to a first structure 30 to route the first fluid 20 to the first structure 30. The first heat exchanger 22 is configured to cool the first fluid 20 directed to it by the first thermostat 26 prior to passage of the first fluid 20 to the first structure 30. The first exchanger bypass 24 is configured to route the first fluid 20 to the first structure 30 so as to bypass the first heat exchanger 22.

The second fluid circuit 18 is fluidly independent of the first fluid circuit 16. The second fluid circuit 18 includes a second fluid 31 separate from the first fluid 20, a second heat exchanger 32, a second exchanger bypass 34, and a second thermostat 36 to selectively control flow of the second fluid 31 between the second heat exchanger 32 and the second exchanger bypass 34. The first and second fluid circuits 16, 18 are fluidly independent of one another in that the circuits 16, 18 do not share any circuit nodes. Illustratively, the second thermostat 36 is fluidly coupled to a second structure 38, the second heat exchanger 32, and the second exchanger bypass 34 to receive the second fluid 31 from the second structure 38 and to direct the second fluid 31 to one or both of the second heat exchanger 32 and the second exchanger bypass 34 dependent upon the temperature of the second fluid 31. The second heat exchanger 32 and the second exchanger bypass 34 are fluidly coupled to the second structure 38 to route the second fluid 31 to the second structure 38. The second heat exchanger 32 is configured to cool the second fluid 31 directed to it by the second thermostat 36 prior to passage of the second fluid 31 to the second structure 38. The second exchanger bypass 34 is configured to route the second fluid 31 to the second structure 38 so as to bypass the second heat exchanger 32.

The cooling system 12 may comprise one or more other fluid circuits. Illustratively, the cooling system 12 comprises a third fluid circuit 40. The third fluid circuit 40 is fluidly independent of the first fluid circuit 16 and the second fluid circuit 18. The third fluid circuit 40 includes a third fluid 42 separate from the first fluid 20 and the second fluid 31, a third heat exchanger 44, a third exchanger bypass 46, and a third thermostat 48 to selectively control flow of the third fluid 42 between the third heat exchanger 44 and the third exchanger bypass 46. The third fluid circuit 40 is fluidly independent of the first and second fluid circuits 16, 18 in that the circuits do not share any circuit nodes. Illustratively, the third thermostat 48 is fluidly coupled to a third structure 50, the third heat exchanger 44, and the third exchanger bypass 46 to receive the third fluid 42 from the third structure 50 and to direct the third fluid 42 to one or both of the third heat exchanger 44 and the third exchanger bypass 46 dependent upon the temperature of the third fluid 42. The third heat exchanger 44 and the third exchanger bypass 46 are fluidly coupled to the third structure 50 to route the third fluid 42 to the third structure 50. The third heat exchanger 44 is configured to cool the third fluid 42 directed to it by the third thermostat 48 prior to passage of the third fluid 42 to the third structure 50. The third exchanger bypass 46 is configured to route the third fluid 42 to the third structure 50 so as to bypass the third heat exchanger 44.

The fan 14 is positioned in proximity to the heat exchangers of the fluid circuits of the cooling system 12. For example, the fan 14 is positioned in proximity to the first heat exchanger 22 and the second heat exchanger 32 to cool the first fluid 20 and the second fluid 31 dependent upon operation of the first thermostat 26 and the second thermostat 36, respectively. The fan 14 may also be positioned in proximity to the third heat exchanger 44 to cool the third fluid 42 dependent upon operation of the third thermostat 48, or even be positioned in proximity to other heat exchangers to cool other fluids dependent upon operation of respective thermostats. In some embodiments, the fan 14 may be a blower fan (also known as a pusher fan) configured to drive air from the fan 14 into the heat exchangers 22, 32, 44. In other embodiments, the fan 14 may be a suction fan configured to draw air through the heat exchangers 22, 32, 44 and then through the fan 14.

The first, second, and third fluid circuits 16, 18, 40 may be configured, for example, as a charge-air circuit, an engine coolant circuit, and an oil circuit (e.g., hydraulic oil circuit), respectively. In such a case, the first fluid 20 may be air pressurized by the fluid source 28 in the form of a turbocharger that is driven by exhaust gas discharged by an engine 52 and that receives ambient air (which may be filtered or otherwise cleaned prior to admission by the turbocharger). The first heat exchanger 22 and the first thermostat 26 may be a charge-air cooler and an air thermostat, respectively. The first structure 30 may include, for example, an air intake manifold of the engine 52 that receives the pressurized air. The circuit 16 with its own thermostat 26 helps manage emissions from the engine 52.

The second fluid 31 may be liquid coolant (e.g., ethylene glycol) heated by the engine 52 and cooled by the second heat exchanger 32 in the form of, for example, a radiator, and the second thermostat 36 may be a coolant thermostat. The second structure 38 may include, for example, the coolant passageways of the engine 52 which route liquid coolant into, through, and out of the engine 52. The second fluid circuit 18 may include a pump 53 (known, for example, as a "water pump") to advance the liquid coolant in the circuit 18. The circuit 18 with its own thermostat 36 helps manage emissions from the engine 52.

The third fluid 42 may be hydraulic oil heated by a hydraulic system included in the cooling system 12 of the vehicle 10 and cooled by the third heat exchanger 44. The third heat exchanger 44 may be a hydraulic oil cooler, and the third thermostat 48 may be a thermostat suitable for controlling flow of hydraulic oil. The third structure 50 may be the hydraulic system which heats the hydraulic oil to be cooled by the third heat exchanger 44.

Each fluid circuit 16, 18 40 (and possibly other fluid circuits as alluded to herein) is thus a thermostatically controlled circuit with its own thermostat 26, 36, 48. Each thermostat 26, 36, 48 modulates the amount of fluid that flows to the respective heat exchanger 22, 32, 44 to regulate the temperature of the respective sub-system, fostering the transient cooling response of each circuit 16, 18, 40.

With each fluid circuit 16, 18, 40 having its own thermostat 26, 36, 48, the cooling system 10 drives the speed of the fan 14 or its pitch angle or both as applicable to whatever may be needed to provide sufficient air flow for the most heavily thermally loaded circuit 16, 18, 40 without overcooling the other circuits 16, 18, 40 of the cooling system. The vehicle 10 may have a control system 54 that receives temperature signals from respective temperature sensors in the circuits 16, 18, 40, or other indications of the thermal load of each circuit 16, 18, 40. Based on the thermal load of the most heavily thermally loaded circuit, the control system outputs control signals to control the fan 14 to address the thermal load of the most heavily thermally loaded circuit. The thermostats 26, 36, 48 operate independently to expose the fluids 20, 31, 42 more or less to the air flow generated by the fan 14 via the heat exchangers 22, 32, 44 to regulate the temperatures of the fluids 20, 31, 42.

The heat exchangers 22, 32, 44 may be arranged in various ways relative to one another to be cooled by air flow induced by the fan 14. In some embodiments, the heat exchangers 22, 32, 44 may be positioned in a parallel-flow arrangement. Illustratively, the heat exchangers 22, 32, 44 may be stacked relative to one another for cooling air to flow in parallel therethrough. The heat exchangers 22, 32, 44 may be stacked in any suitable arrangement. In other embodiments, the heat exchangers 22, 32, 44 may be positioned in a series-flow arrangement such that the same cooling air flows in turn through each heat exchanger 22, 32, 44 depending on its position in the cooling package. The heat exchangers 22, 32, 44 could also be configured in a hybrid arrangement with both series and parallel cooling air flow networks.

Regarding harvesters, such as, for example, combine harvesters, it is desirable to maintain a minimum air flow through the cooling system (e.g., cooling system 12) to avoid plugging of the heat exchangers and to manage debris in the engine compartment. This makes having one relatively large fan (e.g., fan 14) capable of delivering a relatively high minimum air flow to the heat exchangers of the individually thermostatically controlled fluid circuits particularly useful and simple for combine harvesters and other harvesters.

Figure 2:
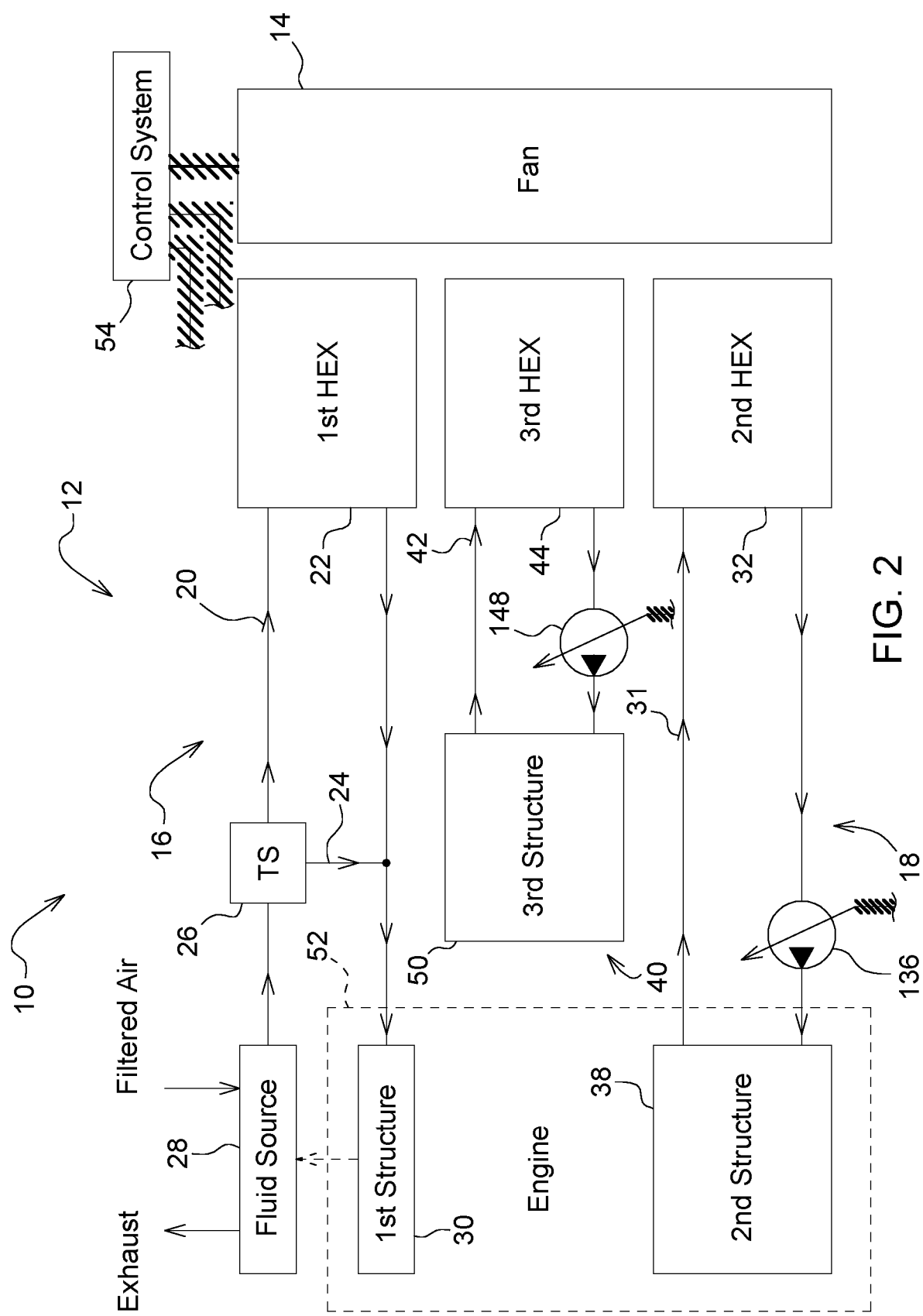
FIG. 2 is a diagrammatic view showing the cooling system with a variable pump in one or more of the fluid circuits.

Referring to FIG. 2, the thermostats 36, 48 in the second and third fluid circuits may be replaced with respective variable pumps 136, 148. In such a case, each pump 136, 148 controls the flow of the respective fluid 31, 42 to and from the respective heat exchanger 32, 44. The respective exchanger bypass 34, 46 may be eliminated. The pump 136 further replaces the water pump 53. The pump 136, 148 may be positioned either in the line conducting fluid to the respective exchanger 32, 44 or in the line conducting fluid away from the respective heat exchanger 32, 44. The pump 136, 148 is a variable speed, variable displacement pump. In some embodiments, the pump 136, 148 may be a variable displacement pump or a variable speed pump. Each pump 136, 148 may be under the control of the control system 54.

Figure 3:
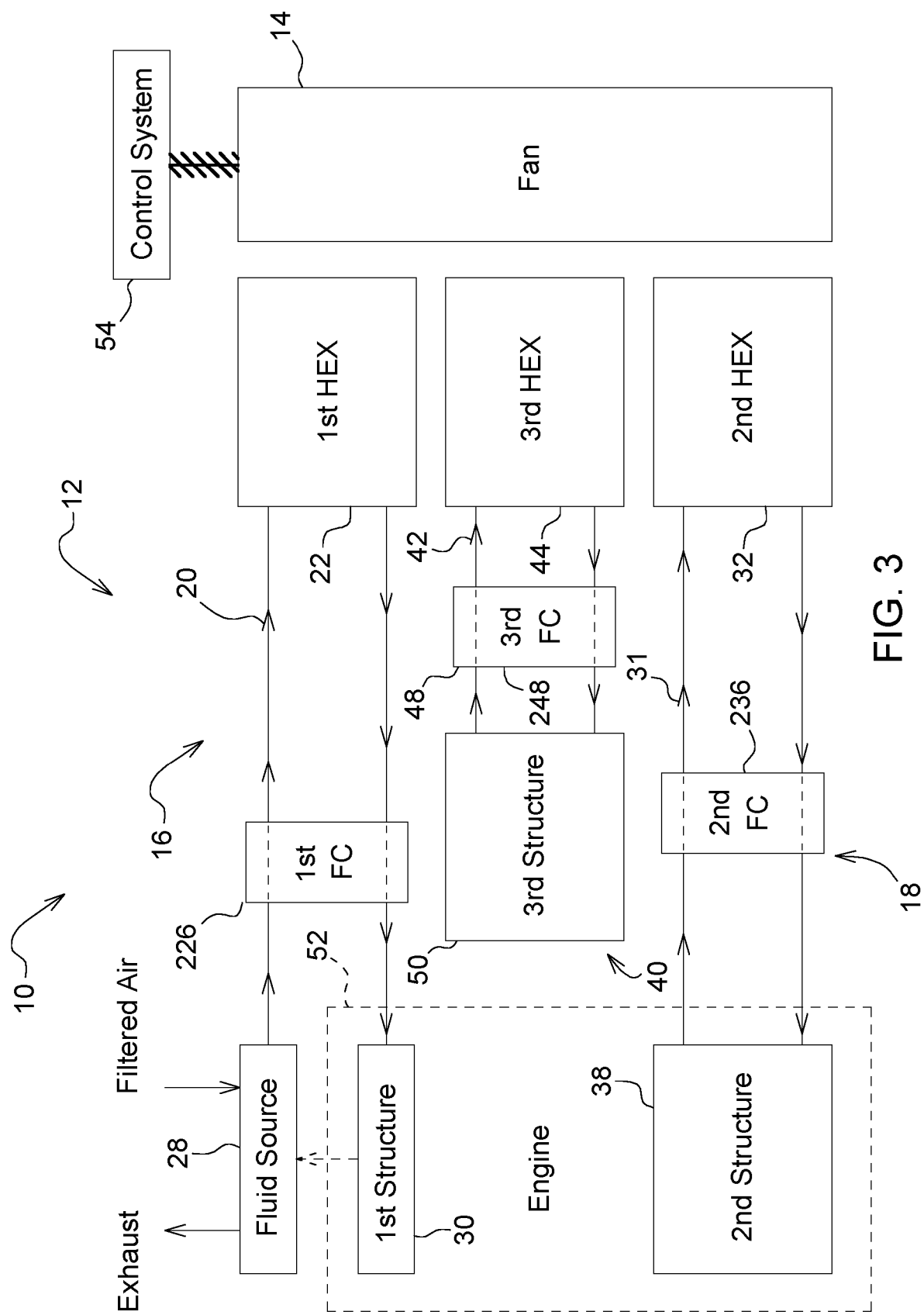
FIG. 3 is a diagrammatic view showing the cooling system with a flow controller in each fluid circuit.

Referring to FIG. 3, each fluid circuit 16, 18, 42 may have a respective flow controller 226, 236, 248 that controls flow of the respective fluid 20, 31, 42 to and from the respective heat exchanger 22, 32, 44. In FIG. 1, the thermostats 26, 36, 48 and the associated exchanger bypasses 24, 34, 44 cooperate to provide examples of the flow controllers 226, 236, 248, respectively. In FIG. 2, the first thermostat 26 and the associated exchanger bypass 24 cooperate to provide an example of the first flow controller 226, and the pumps 136, 148 are examples of the flow controllers 236, 248, respectively. As such, the depiction of each flow controller 226, 236, 248 in FIG. 3 represents that the flow controller 226, 236, 248 may be positioned in the line conducting fluid to the respective heat exchanger 22, 32, 44, in the line conducting fluid away from the respective heat exchanger 22, 32, 44, or in both lines.

In an embodiment of the cooling system 12, a cooling system comprises a fan and two or more fluid circuits fluidly independent of one another. Each fluid circuit comprises a fluid separate from the fluid of each of the other fluid circuit(s), a heat exchanger, and a flow controller to control flow of the fluid of the fluid circuit to and from the heat exchanger. The fan is positioned in proximity to each of the heat exchangers to cool each of the fluid dependent upon operation of the respective flow controller. In some embodiments, at least one of the flow controllers comprises an exchanger bypass and a thermostat to selectively control flow of the respective fluid between the respective heat exchanger and the respective exchanger bypass. In some embodiments, at least one of the flow controllers comprises a variable pump to control flow of the respective fluid to and from the respective heat exchanger. The pump(s) may be a variable speed, variable displacement pump, a variable displacement pump, or a variable speed pump.

While the above describes example embodiments of the present disclosure, these descriptions should not be viewed in a limiting sense. Rather, other variations and modifications may be made without departing from the scope and spirit of the present disclosure as defined in the appended claims.

What is claimed is:

1. A cooling system, comprising:
a fan,
a first fluid circuit comprising a first fluid, a first heat exchanger, a first exchanger bypass, and a first thermostat to selectively control flow of the first fluid between the first heat exchanger and the first exchanger bypass, and
a second fluid circuit fluidly independent of the first fluid circuit, the second fluid circuit comprising a second fluid separate from the first fluid, a second heat exchanger, a second exchanger bypass, and a second thermostat to selectively control flow of the second fluid between the second heat exchanger and the second exchanger bypass, the fan positioned in proximity to the first heat exchanger and the second heat exchanger to cool the first fluid and the second fluid dependent upon operation of the first thermostat and the second thermostat, respectively, wherein the first and second fluids are different fluid types from one another.

2. The cooling system of claim 1, comprising an engine in fluid communication with the first fluid circuit and the second fluid circuit.

3. The cooling system of claim 1, wherein the first fluid comprises mainly air, and the second fluid comprises mainly liquid coolant.

4. The cooling system of claim 1, where the first thermostat is an air thermostat in fluid communication with a turbocharger, and the second thermostat is a coolant thermostat in fluid communication with an engine.

5. The cooling system of claim 1, wherein the first heat exchanger comprises a charge-air cooler, and the second heat exchanger comprises a radiator.

6. The cooling system of claim 1, comprising a third fluid circuit fluidly independent of the first fluid circuit and the second fluid circuit, wherein the third fluid circuit comprises a third fluid separate from the first fluid and the second fluid, a third heat exchanger, and a third thermostat to selectively control flow of the third fluid between the third heat exchanger and the third exchanger bypass, the fan positioned in proximity to the third heat exchanger to cool the third fluid dependent upon operation of the third thermostat.

7. The cooling system of claim 6, wherein the first fluid is air, the second fluid is liquid coolant, and the third fluid is oil.

8. The cooling system of claim 6, wherein the first heat exchanger comprises a charge-air cooler, the second heat exchanger comprises a radiator, and the third heat exchanger comprises an oil cooler.

* * * * *